UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MAKING VAT-DYESTUFFS.

No. 881,624.      Specification of Letters Patent.      Patented March 10, 1908.

Application filed May 22, 1907. Serial No. 375,126.

*To all whom it may concern:*

Be it known that we, ALBRECHT SCHMIDT, Ph. D., and ERNST BRYK, Ph. D., chemists, citizens of the Empires of Germany and Austria - Hungary, respectively, residing at Höchst-on-the-Main, Germany, have invented certain new and useful Improvements in Making Vat-Dyestuffs, of which the following is a specification.

We have found a process of making vat dyestuffs by treating such para-methyl substituted arylthioglycolic acids with chlorsulfonic acid ($SO_3HCl$) as are not substituted in one ortho position to the $S.CH_2COOH$ group and containing at least one more methyl group, that is to say, thioglycolic acids having the general constitution:

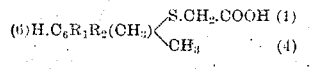

wherein $R^1$, $R^2$ means the indifferent radicals, hydrogen and methyl. Thus vat dyestuffs are obtained having the formula:

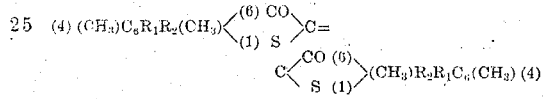

The process is carried out by introducing the thioglycolic acid into chlor-sulfonic acid; according to the thioglycolic acid the mass may be cooled or gently heated, when hydrochloric acid is evolved. On the reaction being complete the whole is poured on ice and filtered.

To remove any unchanged parent material and by-products, the dyestuffs are purified by washing with hot water, hot dilute alkalies and then with hot alcohol. They are insoluble in water, alkalies and dilute acids; on treatment with alkaline reducing agents, like hydrosulfites, they are dissolved in form of leuco compounds and from this solution (vats) they dye cotton and wool very fast shades varying according to the kind, number and position of the substituents, as may be seen from the examples given below.

The aforesaid parent materials may be obtained according to known methods, for instance, from the corresponding amins, like asymmetric meta-xylidin:

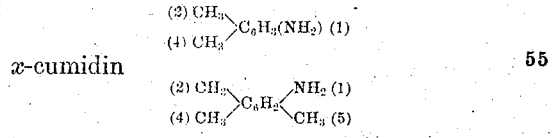

*x*-cumidin by diazotizing and by combining the diazo compound with a xanthogenate and by treating the xanthogenate ester with chlor-acetic acid in alkaline solution, for instance, in alcohol-alkaline solution.

Example I. 1 part by weight of xylylthioglycolic acid

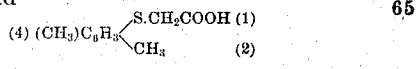

obtained, for instance, from asymmetric xylidin

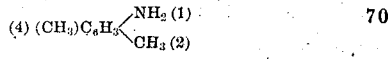

is introduced while cooling into about 2 volume parts of chlor-sulfonic acid. On the evolution of hydrochloric acid diminishing and the olive-green coloration no longer increasing, the mass is worked up in the aforesaid manner. The dyestuff is a violet powder, insoluble in water, alkalies, dilute mineral acids, soluble in concentrated sulfuric acid with a green color, in hot nitrobenzene with a red-violet color; it dyes cotton in the vat blue-violet.

Example II. 1 part of pseudo - cumylthioglycolic acid

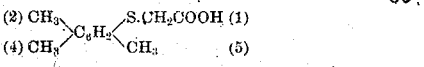

is introduced while cooling into about 1.5 volume parts of chlor-sulfonic acid. The temperature hereby rises gradually and on the reaction being complete the olive-green mass is worked up as before described.

The dyestuff having the formula:

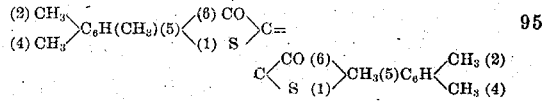

is a dark violet powder, insoluble in water, alkalies, dilute mineral acid, soluble in concentrated sulfuric acid with a green color, in hot nitrobenzene with a red-violet color; it dyes cotton in the vat blue-violet and wool in more violet shades.

Having now described our invention, what we claim is:

1. The process herein described of making vat dyestuffs of the type:

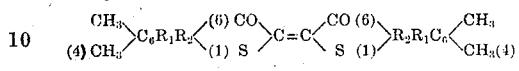

which consists in treating arylthioglycolic acids of the type:

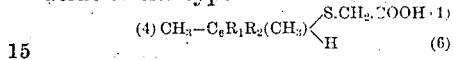

wherein "R" means hydrogen and methyl, with chlorsulfonic acid.

2. As a new product, the vat dyestuff dyeing cotton blue-violet having the formula:

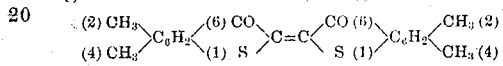

being insoluble in water, alkalies, dilute acids, soluble in hot nitrobenzene with red-violet color, in concentrated sulfuric acid with a green color, forming a vat with alkali hydrates from which cotton is dyed in blue-violet tints.

3. As a new product, the vat dyestuff dyeing cotton blue-violet having the formula:

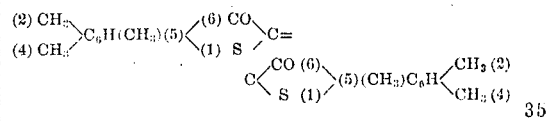

being insoluble in water, alkalies, dilute acids, soluble in hot nitrobenzene with red-violet color, in concentrated sulfuric acid with a green color, forming a vat with alkali hydrates from which cotton is dyed in blue-violet tints.

In testimony, that we claim the foregoing as our invention, we have signed our names in presence of two subscribing witnesses.

ALBRECHT SCHMIDT.
ERNST BRYK.

Witnesses:
JEAN GRUND,
CARL GRUND.